United States Patent
Kumar et al.

(10) Patent No.: US 12,486,906 B2
(45) Date of Patent: Dec. 2, 2025

(54) BALL VALVE WITH ENHANCED FLOW ACCURACY FEATURES

(71) Applicant: Precision Engine Controls Corporation, San Diego, CA (US)

(72) Inventors: Benoy Kumar, San Diego, CA (US); Albert J. Wu, San Diego, CA (US)

(73) Assignee: Precision Engine Controls Corporation, San Diego, CA (US)

( * ) Notice: Subject to any disclaimer, the term of this patent is extended or adjusted under 35 U.S.C. 154(b) by 2 days.

(21) Appl. No.: 18/436,132

(22) Filed: Feb. 8, 2024

(65) Prior Publication Data

US 2024/0392881 A1    Nov. 28, 2024

Related U.S. Application Data

(60) Provisional application No. 63/504,452, filed on May 26, 2023.

(51) Int. Cl.
  *F16K 5/06* (2006.01)
  *F16K 5/10* (2006.01)

(52) U.S. Cl.
  CPC .......... *F16K 5/0605* (2013.01); *F16K 5/0647* (2013.01); *F16K 5/10* (2013.01)

(58) Field of Classification Search
  CPC ........ F16K 5/0605; F16K 5/0647; F16K 5/10; F16K 5/12
  See application file for complete search history.

(56) References Cited

U.S. PATENT DOCUMENTS

| | | | |
|---|---|---|---|
| 6,021,812 A * | 2/2000 | Iwamoto | F16K 5/12 137/625.3 |
| 2014/0319394 A1* | 10/2014 | Bisio | F16K 5/204 251/160 |
| 2016/0123479 A1* | 5/2016 | Keller | F16K 5/0605 251/309 |

FOREIGN PATENT DOCUMENTS

| | | | |
|---|---|---|---|
| CH | 708205 A1 | 12/2014 | |
| CN | 206802373 U | 12/2017 | |
| CN | 112032343 A | 12/2020 | |
| DE | 102007025516 B4 * | 10/2009 | F16K 11/0873 |
| WO | 01/33120 A1 | 5/2001 | |

OTHER PUBLICATIONS

Gosco Valves, "S-Class, Soft Seated Ball Valves", retrieved from the Internet at: https://nibsco-automation.com/wp-content/uploads/Gosco-S-Class-Catalogue-V2.3.pdf on Mar. 10, 2023.

\* cited by examiner

*Primary Examiner* — Marina A Tietjen
(74) *Attorney, Agent, or Firm* — McDonnell Boehnen Hulbert & Berghoff LLP

(57) ABSTRACT

An example valve includes: a housing having a first port and a second port; a stem disposed and rotatable within the housing; and a ball disposed within the housing and rotatable by the stem, wherein the ball has a hole therethrough to control fluid flow from the first port to the second port, wherein the hole has a profile comprising: a first opening at a base of the hole, a first channel connected to and extending from the first opening, wherein the first channel has a width that is less than a respective width of the first opening such that a neck portion is formed at a connection of the first channel with the first opening, a second channel extending from the first channel and diverging by a particular angle, and a second opening connected to the second channel.

18 Claims, 5 Drawing Sheets

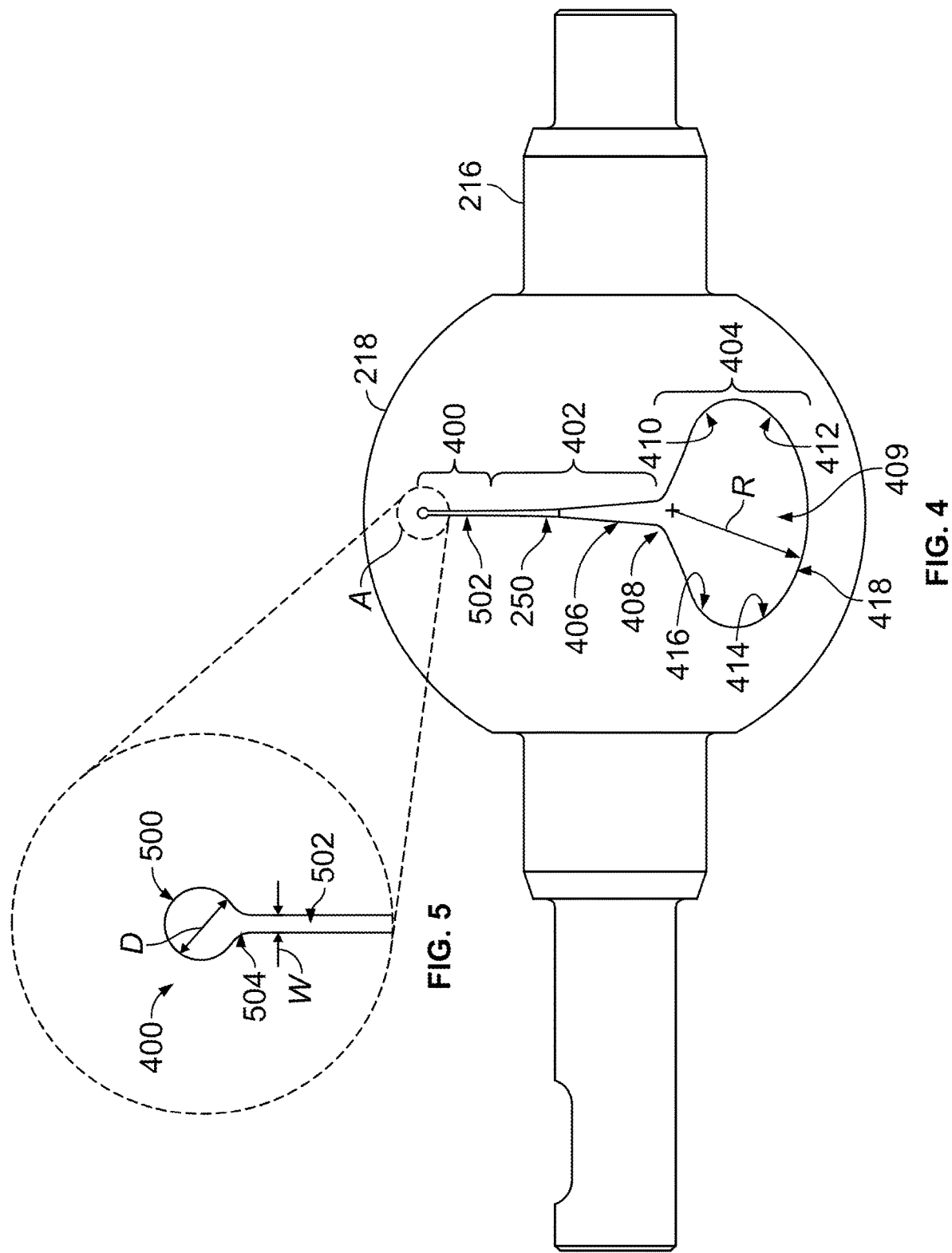

600 ⤴

602 — ROTATING A STEM OF A VALVE, WHEREIN THE VALVE COMPRISES (I) A HOUSING HAVING A FIRST PORT AND A SECOND PORT, (II) A BALL DISPOSED WITHIN THE HOUSING AND ROTATABLE BY THE STEM, WHEREIN THE BALL HAS A HOLE THERETHROUGH TO CONTROL FLUID FLOW FROM THE FIRST PORT TO THE SECOND PORT, WHEREIN ROTATING THE STEM CAUSES THE BALL TO ROTATE SUCH THAT A CIRCULAR OPENING AT A BASE OF THE HOLE IS EXPOSED TO FLUID FROM THE FIRST PORT AND ALLOWS A PREDETERMINED FLUID FLOW RATE THERETHROUGH

↓

604 — FURTHER ROTATING THE STEM, THEREBY CAUSING A FIRST CHANNEL OF THE HOLE TO BE EXPOSED TO FLUID FROM THE FIRST PORT, WHEREIN THE FIRST CHANNEL IS CONNECTED TO AND EXTENDS FROM THE CIRCULAR OPENING, WHEREIN THE FIRST CHANNEL HAS A WIDTH THAT IS LESS THAN A DIAMETER OF THE CIRCULAR OPENING SUCH THAT A NECK PORTION IS FORMED AT A CONNECTION OF THE FIRST CHANNEL WITH THE CIRCULAR OPENING, AND WHEREIN A FLOW AREA OF THE HOLE INCREASES AT A FIRST RATE OF CHANGE AS THE FIRST CHANNEL BECOMES MORE EXPOSED TO FLUID FROM THE FIRST PORT WITH ROTATION OF THE BALL

↓

606 — FURTHER ROTATING THE STEM, THEREBY CAUSING A SECOND CHANNEL OF THE HOLE TO BE EXPOSED TO FLUID FROM THE FIRST PORT, WHEREIN THE SECOND CHANNEL EXTENDS FROM THE FIRST CHANNEL AND DIVERGES BY A PARTICULAR ANGLE, AND WHEREIN THE FLOW AREA OF THE HOLE INCREASES AT A SECOND RATE OF CHANGE AS THE SECOND CHANNEL BECOMES MORE EXPOSED TO FLUID FROM THE FIRST PORT WITH ROTATION OF THE BALL, AND WHEREIN THE SECOND RATE OF CHANGE IS LARGER THAN THE FIRST RATE OF CHANGE ASSOCIATED WITH THE FIRST CHANNEL

FIG. 6

BALL VALVE WITH ENHANCED FLOW ACCURACY FEATURES

CROSS REFERENCE TO RELATED APPLICATION

The present application claims priority to U.S. Provisional Patent Application No. 63/504,452 filed on May 26, 2023, the entire contents of which are herein incorporated by reference as if fully set forth in this description.

BACKGROUND

A ball valve is a type of valve that uses a hollow, perforated ball to control the flow of fluid through it. Ball valves have evolved over time. Some conventional ball valves have full bores and were used primarily as on/off valves. In such valves, the ball has a full circular cutout that forms a large flow area when the valve is fully open. These valves are characterized by poor flow gain control, particularly at small flow rates. Specifically, slight change in rotary position of the ball results in high flow rate changes (high flow gain). When powered with an actuator, slight unrepeatability in positioning by the actuator results in a significant change in fluid flow. Thus, if the valve is commanded to a given position after power cycling or after moving to a different position, the flow rate could be significantly different each time. Therefore, these valves are not accurate at low flows.

To improve the low flow accuracy, some ball valves have a V-port, where the ball cutout is V-shaped. These V-port valves can have 15 degree, 30 degree, or 60 degree V-shaped cutouts in the ball, for example. While the 15 degree cutout valve may offer better accuracy and resolution at the lower end of the flow rates range compared to full circular cutout valves, it has a reduced flow capacity at the higher end. In contrast, the 60 degree cutout may offer higher flow capacity but much lower flow resolution and accuracy at the lower end.

Thus, these valves do not provide a combination of high flow capacity and high flow accuracy at low flow rates. As such, these valves might not be suitable in some applications. As an example for illustration, some applications, such as low emissions industrial gas turbines, require a turndown ratio of up to 350:1. In other words, it is expected that the turbine works with stable combustion throughout a wide range of fuel flow rates, where the ratio of the maximum fuel flow rates to the minimum fuel flow rate is 350. This indicates that the lowest controllable fuel flow rate could be a fraction (1/350 or 0.288%) of the maximum flow capacity. At such low flow rates, flow accuracy of 5% (e.g., 0.014% of full scale flow rates) may be desired. This high accuracy requirement at low flow rates may be difficult to achieve using conventional ball valves.

It may thus be desirable to have a ball valve that has a high flow capacity combined with high flow accuracy at the low end of flow rates. It is with respect to these and other considerations that the disclosure made herein is presented.

SUMMARY

The present disclosure describes implementations that relate to a ball valve with enhanced flow accuracy features.

In a first example implementation, the present disclosure describes a valve. The valve includes: a housing having a first port and a second port; a stem disposed and rotatable within the housing; and a ball disposed within the housing and rotatable by the stem, wherein the ball has a hole therethrough to control fluid flow from the first port to the second port, wherein the hole has a profile comprising: a first opening at a base of the hole, a first channel connected to and extending from the first opening, wherein the first channel has a width that is less than a respective width of the first opening such that a neck portion is formed at a connection of the first channel with the first opening, a second channel extending from the first channel and diverging by a particular angle, and a second opening connected to the second channel.

In a second example implementation, the present disclosure describes an assembly. The assembly includes: an electronics module; an electric motor, wherein the electronics module is mounted to and controls the electric motor; and the valve of the first example implementation, where the stem is rotatable via the electric motor.

In a third example implementation, the present disclosure describes a method of operating the valve of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 4 illustrates a side view of the ball and the stem integrated therewith, in accordance with an example implementation.

FIG. 5 illustrates is a close-up view of a portion of the profile of a hole of the ball of FIGS. 3-4, in accordance with an example implementation.

FIG. 6 is a flowchart of a method for operating a valve, in accordance with an example implementation.

DETAILED DESCRIPTION

Disclosed herein is a ball valve and an assembly including the ball valve, where the ball valve is capable of allowing high flow rates to flow therethrough while being also capable of accurately controlling small fluid flow rates.

Within examples, a disclosed ball valve includes a ball having a hole with a profile that allows for precise control of fluid flow rates and flow gains at a lower end of flow rates, while allowing high flow rates through the ball valve when the valve is fully open. The profile includes a first opening at a base of the profile to allow for a minimum or predetermined amount of flow rates when the valve starts to open. The profile also includes a first channel connected to the first opening, where the channel has a width that is smaller than a respective width of the first opening. In an example, the first channel can be bounded by substantially parallel sides, but in other examples, the channel may diverge at a small rate. This way, the rate of change of flow area through the valve is substantially constant or increases a first rate that is small.

The profile may then include a second channel connected to the first channel, where the second channel diverges such that the flow area increases at a second rate, higher than the first rate associated with the first channel. To enable the valve to allow high flows therethrough, the second channel is followed by or connected to a large second opening characterized by a third rate of increase in the flow area that is higher than the second rate. With this configuration of the profile, the valve has high flow capacity when fully open, while being able to control fluid flow rates precisely at low flows when the valve "cracks" open.

Figure 1:
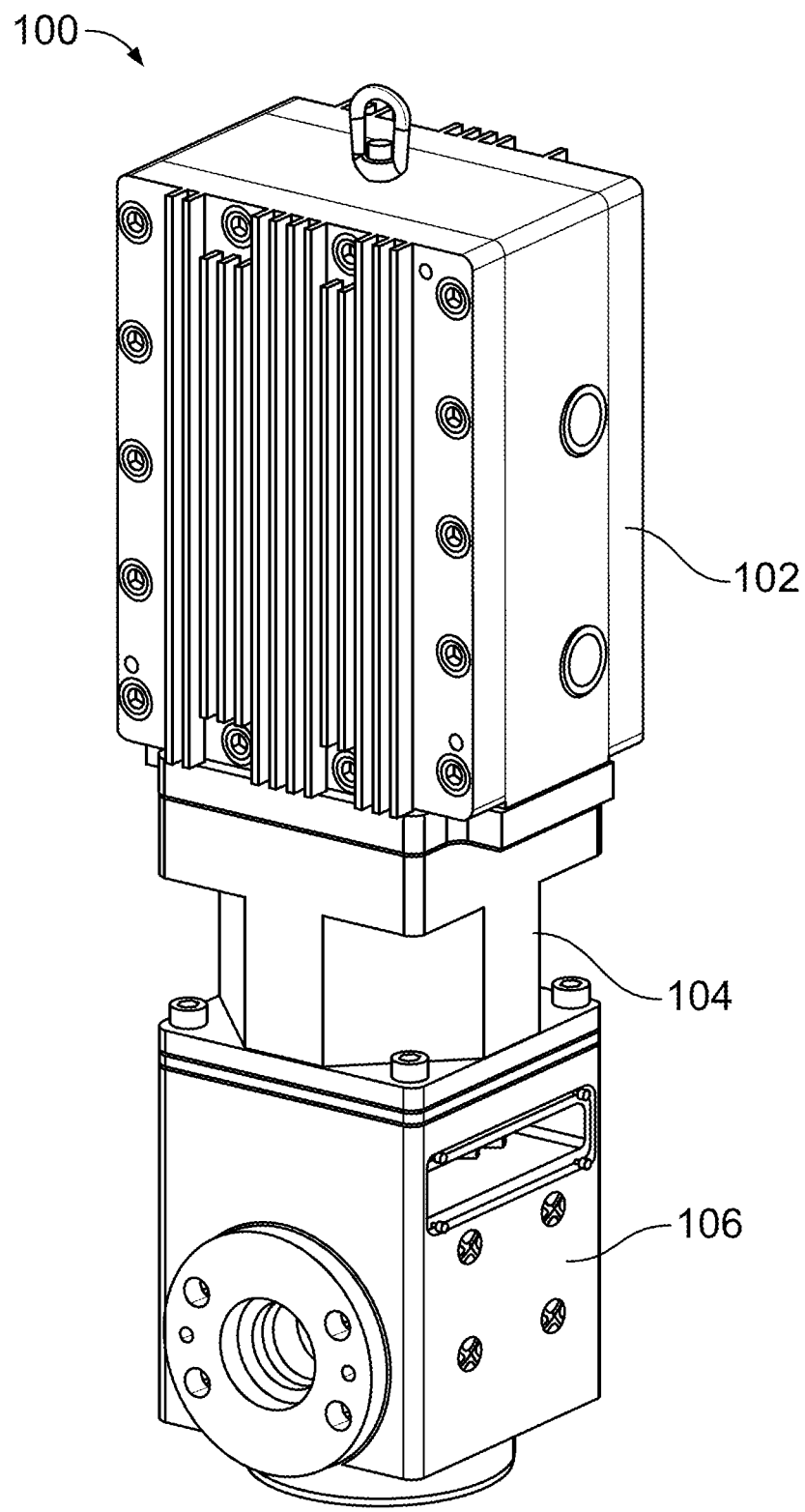
FIG. 1 illustrates a perspective view of an assembly, in accordance with an example implementation.

FIG. 1 illustrates a perspective view of an assembly 100, in accordance with an example implementation. The assembly includes an electronics module 102, an electric motor 104, and a valve 106. As depicted, the electronics module 102 is mounted to the electric motor 104, which is coupled to the valve 106 to drive a movable element of the valve 106.

In the example implementation described herein, the valve 106 is a ball valve that is electrically actuated via the electric motor 104. However, it should be understood that other actuation mechanisms could be used. For instance, a handle or lever can be used to manually actuate the ball valve. In another example, the ball valve can be actuated via a fluid actuation mechanism (pneumatic or hydraulic).

The electric motor 104 can be any type of electric motors (e.g., permanent magnet motor, a switch reluctance motor, a flux switching motor, an induction motor, etc.). For example, the electric motor 104 can include a stator fixedly disposed within a housing of the electric motor 104. The stator can include a lamination stack. The stator may also include wire windings wrapped about the lamination stack. When electric current is provided through the wire windings of the stator, a magnetic field is generated.

The stator may form an annular space therein, and the electric motor 104 can further include a rotor disposed in the annular space of the stator. The electric motor 104 may include a plurality of magnets that can be mounted to, and disposed in a circular or circumferential array about, an exterior surface of the rotor. The magnets may be configured to interact with the magnetic field generated by the windings of the stator to rotate the rotor and produce torque to drive the valve 106.

The electronics module 102 is configured to control the electric motor 104. For instance, the electronics module 102 can include a controller and an inverter. The inverter can be configured as a power converter that converts direct current (DC) power received at the inverter (e.g., received from a battery or electric generator) to three-phase, alternating current (AC) power that can be provided to wire windings of a stator of the electric motor 104 to drive the electric motor 104. The controller may have a microprocessor that provides a pulse width modulated (PWM) signal to operate the power converter of the inverter, for example.

Figure 2:
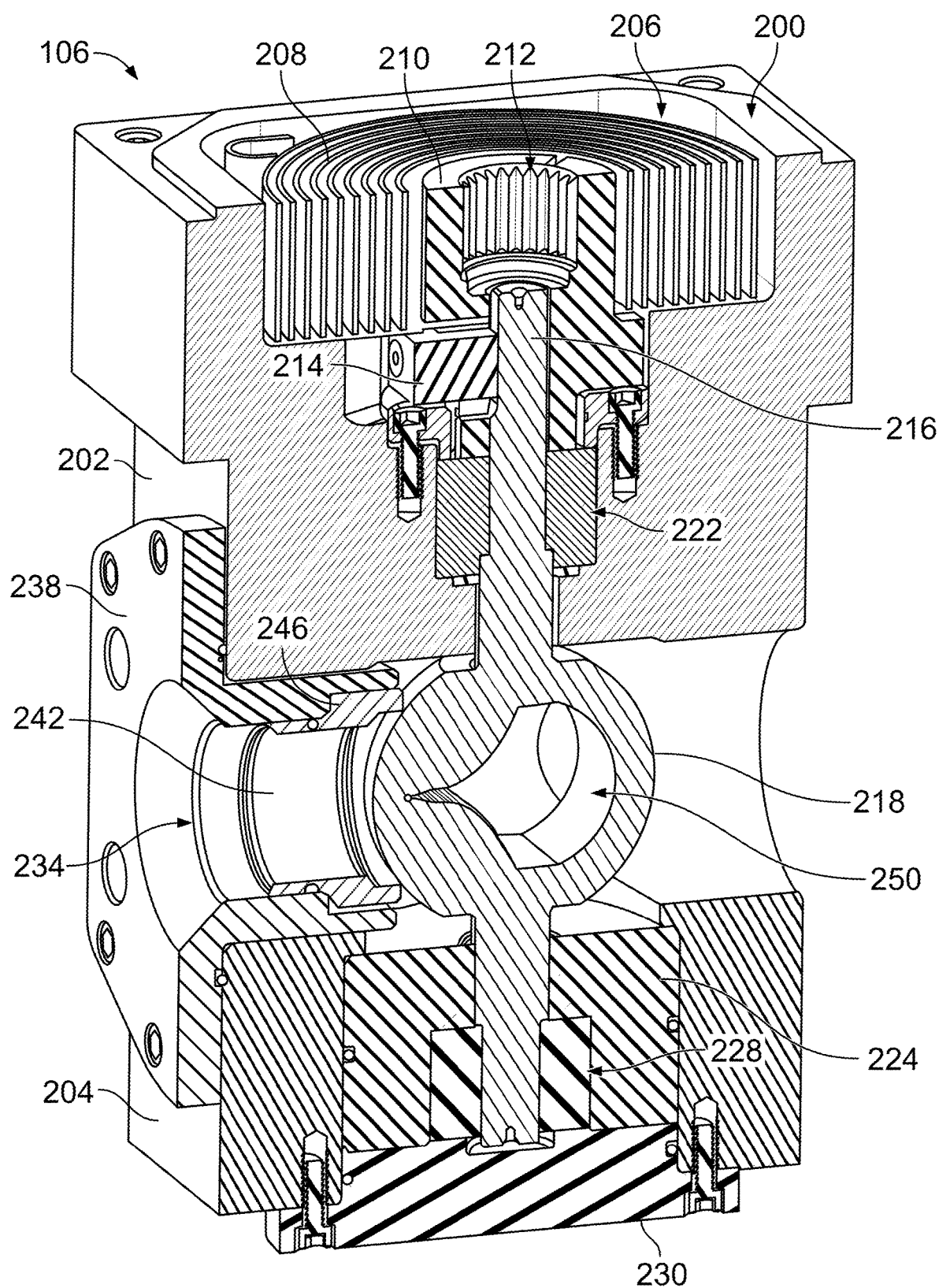
FIG. 2 illustrates a perspective cross-sectional view of a valve of the assembly of FIG. 1, in accordance with an example implementation.

FIG. 2 illustrates a perspective cross-sectional view of the valve 106, in accordance with an example implementation. The valve 106 includes a housing 200 having a first housing portion 202 (e.g., upper housing portion) and a second housing portion 204 (e.g., a bottom housing portion).

The first housing portion 202 includes a depression or cavity 206 configured to receive a return spring 208 (e.g., a spiral spring, torsional spring, compression or tension spring, etc.). The return spring 208 is disposed about an input shaft 210 that has internal splines 212. The internal splines 212 can facilitate coupling an output shaft of the electric motor 104 to the input shaft 210. The output shaft of the electric motor 104 is coupled to or integrated with the rotor of the electric motor 104, and thus the rotary motion of the rotor of the electric motor 104 is transmitted to the input shaft 210. Other coupling mechanisms could be used such as key-keyway arrangements, self-holding taper arrangement, press fitting, etc.). Further, in other examples, as mentioned above, a lever or other actuation device could be coupled to the input shaft 210, rather than an output shaft of an electric motor.

The valve 106 can further include a clamp 214 that mechanically couples the input shaft 210 to a stem 216. With this configuration of the clamp 214, hysteresis of the valve 106 may be reduced or eliminated. The valve 106 includes a ball 218 coupled to the stem 216 and configured to control fluid flow through the valve 106 as described in more detail below.

In an example, the ball 218 is integrated with the stem 216 to form a component having a unitary construction. Notably, by having the stem 216 integrated with the ball 218, there is no mechanical hysteresis (e.g., slop or play) between the rotary motion of the stem 216 and the rotary motion of the ball 218. This configuration may enhance accuracy in controlling the rotational position of the ball 218, and thus the fluid flow through the valve 106. However, in other example, the stem 216 and the ball 218 can be separate components coupled together via any coupling mechanism (e.g., press fit, splines, key arrangement, etc.).

The first housing portion 202 can be configured as a seal and bearing carrier. For example, The first housing portion 202 accommodates a first bearing subassembly 222 (e.g., one or more ball bearings) disposed about an upper portion of the stem 216 (the side of the stem 216 that is coupled to the input shaft 210) to facilitate rotation of the stem 216 inside the housing 200 about a longitudinal axis of the stem 216.

The second housing portion 204 accommodates a carrier 224, which is a hollow cylindrical component that in turn accommodates a second bearing subassembly 228 disposed about a bottom portion of the stem 216 (the other side of the stem 216 relative to the ball 218, opposite the side coupled to the input shaft 210) to further support and facilitate rotation of the stem 216 inside the housing 200. The valve 106 includes a cover 230 that is mounted to the second housing portion 204 and configured to retain the carrier 224.

The housing 200 includes a through-hole that operates as a fluid flow path formed therein, and the flow path is perpendicular to the axis of rotation of the stem 216. Particularly, the housing 200 can have a first port 234 and a second port 236. The first port 234 can be an inlet port, while the second port 236 can be an outlet port.

The valve 106 includes a flange 238 mounted at the first port 234 and attached to the housing 200 (e.g., via fasteners). The flange 238 supports a seat 242 for the ball 218. The ball 218 may form a metal-to metal seal with the seat 242 to prevent fluid leakage.

The valve 106 can further include a plurality of face and radial seals to ensure that no leakage occurs from the valve 106. For example, as depicted in FIG. 2, face seals can be used to seal between the flange 238 and the housing 200, and radial seals can be used to seal between exterior surfaces of the seat 242 and the respective flanges that support them.

The ball 218 is configured as a spherical shell that has a hole 250 formed therethrough (e.g., through a center of the ball 218). The hole 250 can also be referred to as an opening, a bore, port, perforation, channel, or passage. When the ball 218 is in the position depicted in FIG. 2, the ball 218 blocks the first port 234 and the second port 236 to prevent fluid flow through the valve 106. Particularly, in this position, the hole 250 is not aligned or overlapped with the either of the first port 234 or the second port 236, and fluid cannot flow through the valve 106.

To open the valve 106 and allow fluid flow therethrough, the electric motor 104 or other actuator can rotate the stem 216 in a clockwise direction from a top view perspective relative to FIG. 2 (e.g., looking from the side of the return spring 208 downward on the stem 216 in FIG. 2). As the ball 218 turns, the hole 250 begins to be gradually exposed to fluid at the first port 234, and the fluid flows through the hole 250 (i.e., through the ball 218) and is then discharged through the second port 236.

The ball 218 can rotate from 0 to more than 90 degrees to change the state of the valve 106 from a closed state (depicted in FIG. 2) to a fully-open state. To return the valve 106 to the closed state, a signal provided to the electric motor 104 can be removed, and the return spring 208 thus returns the stem 216 and the ball 218 to the closed state depicted in FIG. 2. The return spring 208 may also reduce or eliminate backlash in the valve 106.

The shape or profile of the hole 250 determines flow characteristics through the valve 106. The flow characteristics can include the maximum flow rate (i.e., flow capacity) of the valve 106, and the flow gain of the valve 106, for example. The flow gain of the valve 106 is used herein to indicate the change of fluid flow rate for a given rotational movement of the ball 218. Flow gain can be expressed as the change in flow rate divided by the change rotational position in degrees (or divided by the change in command signal to the electric motor 104), for example.

The profile of the hole 250 is configured such that the valve 106 can achieve fine control of the flow gain as the valve 106 "cracks" opens or during an initial portion of the rotational stroke of the stem 216 and the ball 218, while also allowing the valve 106 to be a high capacity valve allowing a large fluid flow rate therethrough when fully open.

Figure 3:
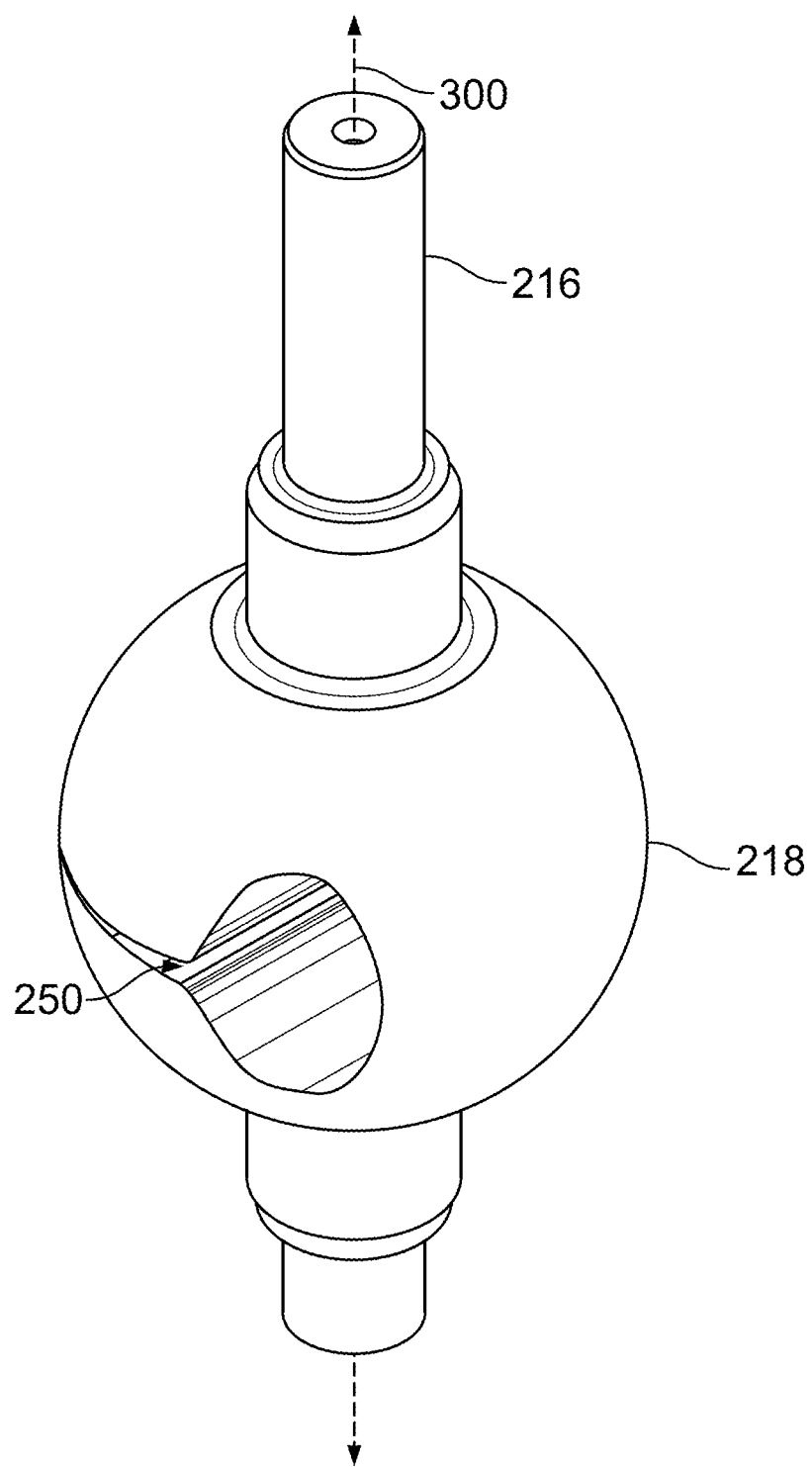
FIG. 3 illustrates a perspective view of a ball and a stem integrated therewith, in accordance with an example implementation.

FIG. 3 illustrates a perspective view of the ball 218 and the stem 216 integrated therewith, FIG. 4 illustrates a side view of the ball 218 and the stem 216 integrated therewith, and FIG. 5 is a close-up view of a portion of the profile of the hole 250 of the ball 218, in accordance with an example implementation. Particularly, FIG. 5 illustrates detail "A" labeled in FIG. 4. FIGS. 3-5 illustrate details of the profile of the hole 250.

The stem 216 is configured to rotate about a longitudinal axis 300 thereof, thereby rotating the ball 218 and gradually exposing the hole 250 to flow from the first port 234. As shown in FIG. 4, the profile of the hole 250 includes at least three regions with different flow gain characteristics. A first region 400 associated with low flow gain, a second region 402 associated with a low flow gain but larger than the flow gain of the first region 400, and a third region 404 with a much larger flow gain.

As the ball 218 rotates from a closed position to a fully-open position, the ball 218 rotates more than 90 degrees, and each of the three regions are subjected to fluid flow sequentially as they get exposed to flow from the first port 234. In other words, the first region 400 is first subjected to fluid flow as the ball 218 turns through a portion of the rotational stroke of the ball (while the second region 402 and the third region 404 are blocked), then the second region 402 is exposed to fluid flow during another portion of the stroke, then as the ball 218 continues to rotate, the first region 400 may become, at least partially blocked, and the third region 404 is exposed to fluid flow during a last part of the stroke. Once the third region 404 is traversed, all of the hole 250 is subjected to fluid flow from the first port 234, and the valve 106 allows maximum fluid flow rate to flow therethrough.

Each of the three regions represents a portion of such the rotational stroke that is greater than 90 degrees. As an example for illustration, the first region 400 may represent about 20 degrees of the rotational stroke, the second region 402 may represent about 40 degrees of the rotational stroke, and the third region 404 may represent about 45 degrees of the rotational stroke. These numbers are example for illustration only, and they can change based on the valve configuration and desired flow capacity.

Thus, the rotational stroke of the ball 218 can be greater than 90 degrees, and portions of the hole 250 are exposed to flow from the first port 234 as the ball 218 rotates. For example, the first region 400 is initially exposed, and then the second region 402 is also exposed. As the ball 218 continues to rotate, the first region 400 may be blocked, while the third region 404 may begin to be exposed. In an example, as the ball 218 continues to rotate, all of the first region 400 may be blocked, and portions of the second region 402 may be blocked, while the third region 404 is exposed. Thus, the span of the hole 250 corresponds to more than 90 degrees of rotation, such that by the end of the rotational stroke, at least portions of the first region 400 and the second region 402 may be blocked, while the third region 404 is exposed.

It may be desirable to have a low flow gain during an initial portion of the rotational stroke of the stem 216 to enable precise control of the fluid flow through the valve 106. It may also be desirable to have a minimum initial flow established as the valve 106 "cracks" open. For example, such initial flow can be about 5% of the maximum flow of the valve. The first region 400 is configured to accomplish at least these characteristics, i.e., precise control and a minimum flow rate when the valve 106 cracks open.

Referring to FIG. 5, which depicts a close-up view of a portion of the first region 400 (the region of the hole 250 that is exposed to flow during an initial portion of the rotational stroke of the stem 216), the first region 400 includes a first opening 500 (e.g., circular, elliptical, square, rectangular, etc.) that is first exposed to flow when the valve 106 cracks open. The first opening 500 has an area that renders the first opening 500 capable of allowing a minimum or predetermined amount of flow rate to flow therethrough. As mentioned above, such minimum flow could be 5% of the maximum flow at a particular pressure drop across the valve 106.

For example, if the valve 106 has a maximum flow capacity of 40 gallons per minute (GPM), the first opening 500 can be configured to allow a flow rate of 2 GPM. For instance, the first opening 500 can be a circular opening having a width or diameter "D" of about 0.05 inches. A circular opening is shown in the Figures as an example for illustration. Other shapes can be used (elliptical, square, rectangular, etc.).

The first region 400 then includes a first slit or first channel 502 connected to and extending from the first opening 500. The first channel 502 is narrow and has a width "W" that is less than the respective width or diameter "D" of the first opening 500, such that a neck portion 504 is formed at the intersection or connection of the first channel 502 with the first opening 500. For example, if the first opening 500 is circular and its diameter "D" is about 0.05 inches, the width of the first channel 502 can be in the range of 0.010-0.013 inches.

In one example, the first channel 502 is substantially straight or have substantially straight sides. In this example, "substantially parallel" indicates that that the two sides or surfaces bounding the first channel 502 are close to parallel, but may have some slight deviation or non-parallelism due to factors such as manufacturing tolerances or misalignment. For instance, the deviation can be a fraction of a degree or a few degrees depending on the size of the first channel 502 and the valve 106. In an example, the deviation can be expressed in terms of a percentage (e.g., 2-5% deviation from parallelism).

In another example, the first channel 502 may slightly diverge (e.g., taper outward) rather than being a straight channel. For example, the first channel 502 may taper outward by 2-3 degrees.

In an example, the first channel 502 can be made by using Electrical Discharge Machining (EDM), which involves eroding the material of the ball 218 using a series of controlled electrical sparks. In the EDM process, an electrically conductive workpiece (e.g., made of metal) is held in a dielectric fluid bath, and an electrode (also made of metal) is positioned above the ball 218. A series of high-frequency electrical sparks are then passed between the electrode and the ball 218, creating a controlled discharge that erodes the material from the ball 218.

By controlling the shape and placement of the electrode, and adjusting the electrical parameters of the process, the first channel 502 (and other portions of the profile of the hole 250) can be precisely machined into the ball 218.

Whether the first channel 502 is straight or tapers slightly, the first channel 502 and the neck portion 504 may ensure that the flow gain in the first region 400, after the first opening 500 has been exposed, and as more of the first channel 502 is being exposed to flow from the first port 234, remains minimal. In other words, as more flow area of the first channel 502 is exposed to flow, the increase in flow rate is small because the percentage of flow area increase as the ball 218 rotates is reduced. Thus, as the ball 218 rotates, the flow area comprised by the first channel 502 increases at a first rate of change that is constant or increases at a small rate. As an example for illustration, the flow gain in the first channel 502 can be about 5% flow change per 1% of rotation of the ball 218.

With this configuration, the hole 250 can meet tight flow accuracy requirements at low flows (when the stem 216 and the ball 218 are rotated through the first portion of their rotational stroke). The circular profile of the first opening 500 at the base of the profile followed by the first channel 502 having a width smaller than the respective width of the first opening 500 such that the neck portion 504 is formed may ensure that in the critical flow control region (low flow region), the width "W" and/or slope of the hole 250 is minimized. This way, the change in flow as the ball 218 rotates is minimized, thereby keeping the flow gain low and less sensitive to positioning accuracy and repeatability of the actuator (e.g., the electric motor 104).

As an example for illustration, a controller may provide a command signal to the electronics module 102 to actuate the electric motor 104 and position the ball 218 at a rotational position corresponding to 6% of maximum flow. Later, the same command may be provided to the electric motor 104, but due to positional inaccuracies (e.g., hysteresis) the ball 218 might be positioned at a position that is slightly different, but the flow might be about 6.1% of maximum flow (i.e., the difference is 0.1%) due to the small flow gain associated with the first region 400 and the first channel 502. In other words, the expected flow rate remains substantially the same (e.g., within 0.5% of the expected flow rate).

Referring back to FIG. 4, the second region 402 involves a second channel 406 connected to, extending from, or follows the first channel 502 of the first region 400. The second channel 406 is a diverging channel that can taper or slope outward. As an example for illustration, the second channel 406 can taper outward or diverge by an angle in the range of 5-7 degrees. In the example where the first channel 502 tapers outward (diverges) slightly, the taper angle of the first channel 502 is less than an angle of divergence of the second channel 406.

Thus, the flow area and the flow gain increase at a second rate of change that is slightly larger than the first rate of change associated with the first channel 502 as the ball 218 continues to rotate past the first region 400 and the first channel 502. The first region 400 and the second region 402 can be considered as forming a critical flow region where the flow gain is small and precisely controlled.

Once the ball 218 rotates past the second region 402 (e.g., past the critical flow region), starting at a transition region 408, the flow area of the hole 250 increases much faster in the third region 404 compared to the second region 402, allowing for high flow. Particularly, the flow area and the flow gain in the third region 404 increase at a third rate of change that is substantially larger than the second rate of change of the second channel 406 and the first rate of change associated with the first channel 502.

As depicted, the third region 404 comprises a second opening 409 connected to the second channel 406. The second opening 409 is large compared to the first channel 502 and the second channel 406. In an example, when the valve 106 is fully open (the ball 218 rotated through its full rotational stroke), the second opening 409 can be disposed at a center of the ball 218.

The second opening 409 can include several curved portion as depicted in FIG. 4. For example, the third region 404 can include four curved portions: a first curved portion 410, a second curved portion 412, a third curved portion 414, and a fourth curved portion 416. As an example for illustration, radius of curvature in each of the curved portions 410-416 can be about 0.25 inches for a valve with a capacity of 40 GPM.

Further, the second curved portion 412 is connected to the third curved portion 414 via a curved portion 418 having a large radius "R." As an example for illustration, radius of curvature of the curved portion 418 can be about 0.8 inches for a valve with a capacity of 40 GPM. With this configuration, once the second opening 409 is fully exposed to the first port 234, the valve 106 can allow flow at maximum capacity (e.g., 40 GPM).

In an example implementation, the length of the first region 400 combined with the second region 402 (e.g., the distance between the beginning of the first opening 500 and the transition region 408) is large than a length of the third region 404. As an example for illustration, for a valve capacity of 40 GPM, the combined length of the first region 400 combined with the second region 402 can be in the range of 1.4-1.5 inches, while the length of the third region 404 can be about 0.8 inches. However, for other valve capacities, the length of the third region 404 can be substantially equal to or larger than the combined length of the first region 400 and the second region 402.

FIG. 6 is a flowchart of a method 600 of operating the valve 106, in accordance with an example implementation. The method 600 may include one or more operations, functions, or actions as illustrated by one or more of steps 602-606.

Although the steps are illustrated in a sequential order, these steps may also be performed in parallel, and/or in a different order than those described herein. Also, the various steps may be combined into fewer steps, divided into additional steps, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes rotating the stem 216 of the valve 106, wherein the valve 106 comprises (i) the housing 200 having the first port 234 and the second port 236, (ii) the ball 218 disposed within the housing 200 and rotatable by the stem 216, wherein the ball 218 has the hole 250 therethrough to control fluid flow from the first port 234 to the second port 236, wherein rotating the stem 216 causes the ball 218 to rotate such that the first opening 500 at a base of the hole 250 is exposed to fluid from the first port 234 and allows a predetermined fluid flow rate therethrough.

At block 604, the method 600 includes further rotating the stem 216, thereby causing the first channel 502 of the hole 250 to be exposed to fluid from the first port 234, wherein the first channel 502 is connected to and extends from the first opening 500, wherein the first channel 502 has a width that is less than a respective width of the first opening 500 such that the neck portion 504 is formed at a connection of the first channel 502 with the first opening 500, and wherein a flow area of the hole 250 increases at a first rate of change as the first channel 502 becomes more exposed to fluid from the first port 234 with rotation of the ball 218.

At block 606, the method 600 includes further rotating the stem 216, thereby causing the second channel 406 of the hole 250 to be exposed to fluid from the first port 234, wherein the second channel 406 extends from the first channel 502 and diverges by a particular angle, and wherein the flow area of the hole 250 increases at a second rate of change as the second channel 406 becomes more exposed to fluid from the first port 234 with rotation of the ball 218, and wherein the second rate of change is larger than the first rate of change associated with the first channel 502.

The method 600 can further include other steps to operate the valve 106 as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a housing having a first port and a second port; a stem disposed and rotatable within the housing; and a ball disposed within the housing and rotatable by the stem, wherein the ball has a hole therethrough to control fluid flow from the first port to the second port, wherein the hole has a profile comprising: a first opening at a base of the hole, a first channel connected to and extending from the first opening, wherein the first channel has a width that is less than a respective width of the first opening such that a neck portion is formed at a connection of the first channel with the first opening, a second channel extending from the first channel and diverging by a particular angle, and a second opening connected to the second channel.

EEE 2 is the valve of EEE 1, wherein the first opening is first exposed to fluid from the first port when the ball rotates, and wherein the first opening allows a predetermined fluid flow rate therethrough.

EEE 3 is the valve of EEE 2, wherein: as the ball continues rotate, the first channel is exposed to fluid from the first port, wherein a flow area of the hole increases at a first rate of change as the first channel becomes more exposed to fluid from the first port with rotation of the ball, and the second channel is then exposed to fluid from the first port, wherein the flow area of the hole increases at a second rate of change as the second channel becomes more exposed to fluid from the first port with rotation of the ball, and wherein the second rate of change is larger than the first rate of change associated with the first channel.

EEE 4 is the valve of EEE 3, wherein the second opening is then exposed to fluid from the first port as the ball continues to rotate, wherein the flow area of the hole increases at a third rate of change as the second opening becomes more exposed to fluid from the first port with rotation of the ball, and wherein the third rate of change is larger than the second rate of change associated with the second channel.

EEE 5 is the valve of any of EEEs 1-4, wherein the first channel is bounded by substantially parallel sides.

EEE 6 is the valve of any of EEEs 1-5, wherein the first channel diverges at an angle that is smaller than the particular angle of divergence of the second channel.

EEE 7 is the valve of any of EEEs 1-6, wherein the ball rotates by a rotational stroke that is greater than 90 degrees for the second opening to be fully exposed to fluid flow from the first port.

EEE 8 is the valve of EEE 7, wherein by an end of the rotational stroke of the ball, at least portions of the first opening and the first channel are blocked.

EEE 9 is the valve of any of EEEs 1-8, wherein the ball is integrated with the stem to form a component of unitary construction.

EEE 10 is an assembly comprising: an electronics module; an electric motor, wherein the electronics module is mounted to and controls the electric motor; and a valve comprising: a housing having a first port and a second port, a stem disposed and rotatable within the housing via the electric motor, and a ball disposed within the housing and rotatable by the stem, wherein the ball has a hole therethrough to control fluid flow from the first port to the second port, wherein the hole has a profile comprising: (i) a first opening at a base of the hole, (ii) a first channel connected to and extending from the first opening, wherein the first channel has a width that is less than a respective width of the first opening such that a neck portion is formed at a connection of the first channel with the first opening, (iii) a second channel extending from the first channel and diverging by a particular angle, and (iv) a second opening connected to the second channel.

EEE 11 is the assembly of EEE 10, wherein the first opening is first exposed to fluid from the first port when the ball rotates, and wherein the first opening allows a predetermined fluid flow rate therethrough.

EEE 12 is the assembly of EEE 11, wherein: as the ball continues rotate, the first channel is exposed to fluid from the first port, wherein a flow area of the hole increases at a first rate of change as the first channel becomes more exposed to fluid from the first port with rotation of the ball, the second channel is then exposed to fluid from the first port, wherein the flow area of the hole increases at a second rate of change as the second channel becomes more exposed to fluid from the first port with rotation of the ball, and wherein the second rate of change is larger than the first rate of change associated with the first channel, and the second opening is then exposed to fluid from the first port as the ball continues to rotate, wherein the flow area of the hole increases at a third rate of change as the second opening becomes more exposed to fluid from the first port with rotation of the ball, and wherein the third rate of change is larger than the second rate of change associated with the second channel.

EEE 13 is the assembly of any of EEEs 10-12, wherein the first channel is bounded by substantially parallel sides.

EEE 14 is the assembly of any of EEEs 10-13, wherein the first channel diverges at an angle that is smaller than the particular angle of divergence of the second channel.

EEE 15 is the assembly of any of EEEs 10-14, further comprising: an input shaft configured to be coupled to an output shaft of the electric motor; and a clamp that mechanically couples the input shaft to the stem.

EEE 16 is the assembly of EEE 15, further comprising: a return spring disposed about the input shaft and configured to return the stem to a closed state, wherein the ball blocks fluid flow from the first port to the second port.

EEE 17 is the assembly of any of EEEs 10-16, wherein the ball is integrated with the stem to form a component of unitary construction.

EEE 18 is a method comprising: rotating a stem of a valve, wherein the valve comprises (i) a housing having a first port and a second port, (ii) a ball disposed within the housing and rotatable by the stem, wherein the ball has a hole therethrough to control fluid flow from the first port to the second port, wherein rotating the stem causes the ball to rotate such that an opening at a base of the hole is exposed to fluid from the first port and allows a predetermined fluid flow rate therethrough; further rotating the stem, thereby causing a first channel of the hole to be exposed to fluid from the first port, wherein the first channel is connected to and extends from the opening, wherein the first channel has a width that is less than a respective width of the opening such that a neck portion is formed at a connection of the first channel with the opening, and wherein a flow area of the hole increases at a first rate of change as the first channel becomes more exposed to fluid from the first port with rotation of the ball; and further rotating the stem, thereby causing a second channel of the hole to be exposed to fluid from the first port, wherein the second channel extends from the first channel and diverges by a particular angle, and wherein the flow area of the hole increases at a second rate of change as the second channel becomes more exposed to fluid from the first port with rotation of the ball, and wherein the second rate of change is larger than the first rate of change associated with the first channel.

EEE 19 is the method of EEE 18, wherein the opening is a first opening, and wherein the method further comprises: further rotating the stem, thereby causing a second opening connected to the second channel of the hole to be exposed to fluid from the first port, wherein the flow area of the hole increases at a third rate of change as the second opening becomes more exposed to fluid from the first port with rotation of the ball, and wherein the third rate of change is larger than the second rate of change associated with the second channel.

EEE 20 is the method of any of EEEs 18-19, wherein rotating the stem comprises providing a command signal to an electric motor to rotate the stem, and wherein the method further comprises: removing the command signal, thereby allowing a return spring to return the stem and the ball to a closed state, wherein the ball blocks fluid flow from the first port to the second port.

What is claimed is:
1. A valve comprising:
a housing having a first port and a second port;
a stem disposed and rotatable within the housing; and
a ball disposed within the housing and rotatable by the stem, wherein the ball has a hole therethrough to control fluid flow from the first port to the second port, wherein the hole has a profile comprising:
a first opening at a base of the hole, a first channel connected to and extending from the first opening, wherein the first channel has a width that is less than a respective width of the first opening such that a neck portion is formed at a connection of the first channel with the first opening,
a second channel extending from the first channel and diverging by a particular angle, and
a second opening connected to the second channel, wherein the ball rotates by a rotational stroke that is greater than 90 degrees for the second opening to be fully exposed to fluid flow from the first port.

2. The valve of claim 1, wherein the first opening is first exposed to fluid from the first port when the ball rotates, and wherein the first opening allows a predetermined fluid flow rate therethrough.

3. The valve of claim 2, wherein:
as the ball continues rotate, the first channel is exposed to fluid from the first port, wherein a flow area of the hole increases at a first rate of change as the first channel becomes more exposed to fluid from the first port with rotation of the ball, and
the second channel is then exposed to fluid from the first port, wherein the flow area of the hole increases at a second rate of change as the second channel becomes more exposed to fluid from the first port with rotation of the ball, and wherein the second rate of change is larger than the first rate of change associated with the first channel.

4. The valve of claim 3, wherein the second opening is then exposed to fluid from the first port as the ball continues to rotate, wherein the flow area of the hole increases at a third rate of change as the second opening becomes more exposed to fluid from the first port with rotation of the ball, and wherein the third rate of change is larger than the second rate of change associated with the second channel.

5. The valve of claim 1, wherein by an end of the rotational stroke of the ball, at least portions of the first opening and the first channel are blocked.

6. The valve of claim 1, wherein the ball is integrated with the stem to form a component of unitary construction.

7. A valve comprising:
a housing having a first port and a second port;
a stem disposed and rotatable within the housing; and
a ball disposed within the housing and rotatable by the stem, wherein the ball has a hole therethrough to control fluid flow from the first port to the second port, wherein the hole has a profile comprising:
a first opening at a base of the hole,
a first channel connected to and extending from the first opening, wherein the first channel has a width that is less than a respective width of the first opening such that a neck portion is formed at a connection of the first channel with the first opening,
a second channel extending from the first channel and diverging by a particular angle, wherein the first channel is bounded by substantially parallel straight sides, or straight sides that diverge at an angle that is smaller than the particular angle of divergence of the second channel, and
a second opening connected to the second channel.

8. An assembly comprising:
an electronics module;
an electric motor, wherein the electronics module is mounted to and controls the electric motor; and
a valve comprising:
a housing having a first port and a second port,
a stem disposed and rotatable within the housing via the electric motor, and
a ball disposed within the housing and rotatable by the stem, wherein the ball has a hole therethrough to control fluid flow from the first port to the second port, wherein the hole has a profile comprising: (i) a first opening at a base of the hole, (ii) a first channel connected to and extending from the first opening, wherein the first channel has a width that is less than a respective width of the first opening such that a neck portion is formed at a connection of the first channel with the first opening, (iii) a second channel extending from the first channel and diverging by a particular angle, and (iv) a second opening connected to the second channel, wherein the ball rotates by a rotational stroke that is greater than 90 degrees for the second opening to be fully exposed to fluid flow from the first port.

9. The assembly of claim 8, wherein the first opening is first exposed to fluid from the first port when the ball rotates, and wherein the first opening allows a predetermined fluid flow rate therethrough.

10. The assembly of claim 9, wherein:
as the ball continues rotate, the first channel is exposed to fluid from the first port, wherein a flow area of the hole increases at a first rate of change as the first channel becomes more exposed to fluid from the first port with rotation of the ball,
the second channel is then exposed to fluid from the first port, wherein the flow area of the hole increases at a second rate of change as the second channel becomes more exposed to fluid from the first port with rotation of the ball, and wherein the second rate of change is larger than the first rate of change associated with the first channel, and
the second opening is then exposed to fluid from the first port as the ball continues to rotate, wherein the flow area of the hole increases at a third rate of change as the second opening becomes more exposed to fluid from the first port with rotation of the ball, and wherein the third rate of change is larger than the second rate of change associated with the second channel.

11. The assembly of claim 8, wherein the first channel is bounded by substantially parallel sides.

12. The assembly of claim 8, wherein the first channel diverges at an angle that is smaller than the particular angle of divergence of the second channel.

13. The assembly of claim 8, further comprising:
an input shaft configured to be coupled to an output shaft of the electric motor; and
a clamp that mechanically couples the input shaft to the stem.

14. The assembly of claim 13, further comprising:
a return spring disposed about the input shaft and configured to return the stem to a closed state, wherein the ball blocks fluid flow from the first port to the second port.

15. The assembly of claim 8, wherein the ball is integrated with the stem to form a component of unitary construction.

16. A method comprising:
rotating a stem of a valve, wherein the valve comprises (i) a housing having a first port and a second port, (ii) a ball disposed within the housing and rotatable by the stem, wherein the ball has a hole therethrough to control fluid flow from the first port to the second port, wherein rotating the stem causes the ball to rotate such that an opening at a base of the hole is exposed to fluid from the first port and allows a predetermined fluid flow rate therethrough;

further rotating the stem, thereby causing a first channel of the hole to be exposed to fluid from the first port, wherein the first channel is connected to and extends from the opening, wherein the first channel has a width that is less than a respective width of the opening such that a neck portion is formed at a connection of the first channel with the opening, and wherein a flow area of the hole increases at a first rate of change as the first channel becomes more exposed to fluid from the first port with rotation of the ball; and further rotating the stem, thereby causing a second channel of the hole to be exposed to fluid from the first port, wherein the second channel extends from the first channel and diverges by a particular angle, and wherein the flow area of the hole increases at a second rate of change as the second channel becomes more exposed to fluid from the first port with rotation of the ball, wherein the second rate of change is larger than the first rate of change associated with the first channel, and wherein the ball rotates by a rotational stroke that is greater than 90 degrees for the second opening to be fully exposed to fluid flow from the first port.

17. The method of claim 16, wherein the opening is a first opening, and wherein the method further comprises:

further rotating the stem, thereby causing a second opening connected to the second channel of the hole to be exposed to fluid from the first port, wherein the flow area of the hole increases at a third rate of change as the second opening becomes more exposed to fluid from the first port with rotation of the ball, and wherein the third rate of change is larger than the second rate of change associated with the second channel.

18. The method of claim 16, wherein rotating the stem comprises providing a command signal to an electric motor to rotate the stem, and wherein the method further comprises:

removing the command signal, thereby allowing a return spring to return the stem and the ball to a closed state, wherein the ball blocks fluid flow from the first port to the second port.

* * * * *